United States Patent
Midorikawa et al.

(10) Patent No.: US 9,204,024 B2
(45) Date of Patent: Dec. 1, 2015

(54) COMMUNICATION DEVICE AND CONTROL METHOD THEREOF

(71) Applicant: CANON KABUSHIKI KAISHA, Tokyo (JP)

(72) Inventors: Kentarou Midorikawa, Yokohama (JP); Junji Takai, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 193 days.

(21) Appl. No.: 13/677,591

(22) Filed: Nov. 15, 2012

(65) Prior Publication Data

US 2013/0128101 A1 May 23, 2013

(30) Foreign Application Priority Data

Nov. 22, 2011 (JP) ................. 2011-255053

(51) Int. Cl.
*H04N 5/225* (2006.01)
*H04N 5/232* (2006.01)

(52) U.S. Cl.
CPC ......... *H04N 5/2256* (2013.01); *H04N 5/23203* (2013.01)

(58) Field of Classification Search
CPC .......... H04N 5/23203; H04N 5/23206; H04N 5/23209; H04N 5/2256; H04N 5/2354
USPC ................................. 348/370–371
See application file for complete search history.

(56) References Cited

U.S. PATENT DOCUMENTS

| 2004/0109082 | A1* | 6/2004 | Yokonuma | 348/371 |
| 2009/0135262 | A1* | 5/2009 | Ogasawara | 348/211.4 |
| 2009/0185797 | A1* | 7/2009 | Ogasawara | 396/59 |
| 2013/0100340 | A1* | 4/2013 | Clark | 348/370 |
| 2013/0128103 | A1* | 5/2013 | Spielberg | 348/371 |
| 2013/0193853 | A1* | 8/2013 | Gouji et al. | 315/130 |

FOREIGN PATENT DOCUMENTS

| JP | 09211649 A | 8/1997 |
| JP | 09211655 A | 8/1997 |
| JP | 2001242511 A | 9/2001 |
| JP | 2005-073201 A | 3/2005 |
| JP | 2010185958 A | 8/2010 |

OTHER PUBLICATIONS

Wikipedia—Control Unit, Feb. 5, 2015, downloaded from http://en.wikipedia.org/wiki/Control_unit on Mar. 8, 2015.*

* cited by examiner

*Primary Examiner* — Timothy J Henn
(74) *Attorney, Agent, or Firm* — Rossi, Kimms & McDowell LLP

(57) ABSTRACT

A communication device capable of preventing a failure in light emission control caused due to communication with a lighting device such as the master and the slave. The communication device is capable of connecting to an image pickup device and transmits a lighting instruction from the image pickup device to a lighting device through a communication unit capable of performing bidirectional communication. It is determined whether or not the lighting device is ready for lighting. The lighting device is prevented from transmitting information to the communication unit when the lighting device is ready for lighting.

13 Claims, 5 Drawing Sheets

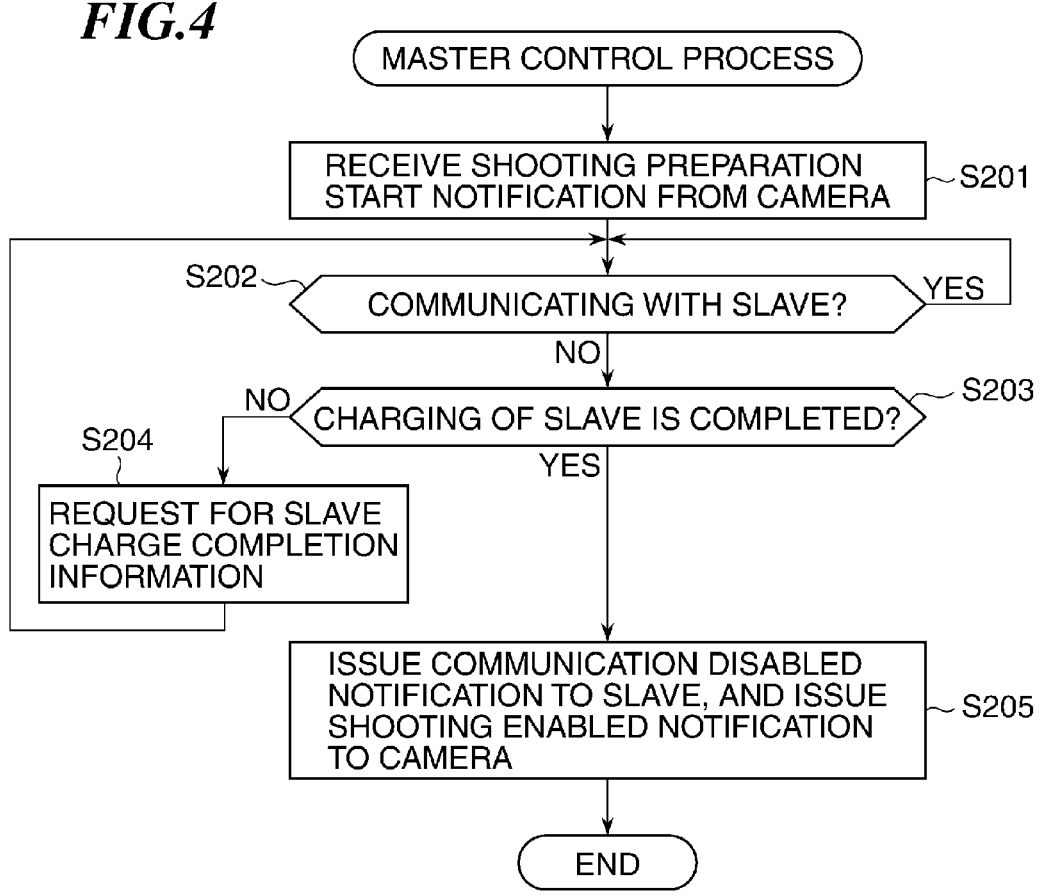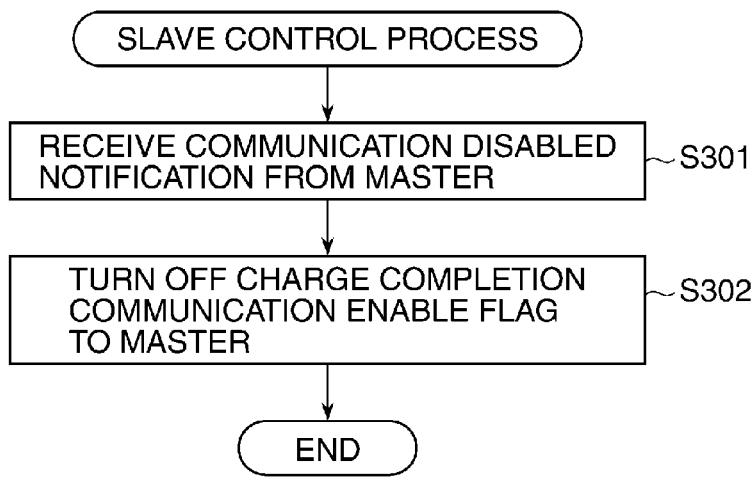

COMMUNICATION DEVICE AND CONTROL METHOD THEREOF

BACKGROUND OF THE INVENTION

1. Field of the Invention

The present invention relates to a communication device and a control method thereof.

2. Description of the Related Art

A conventional camera system takes control of unidirectional communication from a master flash (hereinafter referred to as "the master" as occasion demands) to a slave flash (hereinafter referred to as "the slave" as occasion demands) through optical pulse communication, which disables slave information, such as charge completion information of the slave, to be acquired. Completion of charging of the slave is notified to a user by turning on of a charge complete lamp which is a slave main body member or issuance of an auxiliary light signal (see Japanese Laid-Open Patent Publication (Kokai) No. 2005-73201, for example).

Moreover, in recent years, spread of wireless communication devices capable of performing bidirectional communication enables, if a communication function is implemented in a flash, information to be acquired from a slave, and thus, a user can recognize the completion of charging of the flash through a display device of a camera main body or a master flash attached to the camera main body.

However, there is an issue regarding wireless communication that, in a case where release control communication from the master and slave information communication from the slave occur at the same time, interference of the communication interrupts transmission of the communication, which may disable slave light emission control to be appropriately performed.

SUMMARY OF THE INVENTION

The present invention provides a communication device and a control method thereof, which are capable of preventing a failure in light emission control caused due to communication with a lighting device such as the master and the slave.

In an aspect of the present invention, there is provided a communication device, capable of connecting to an image pickup device, that transmits a lighting instruction from the image pickup device to a lighting device through a communication unit capable of performing bidirectional communication, comprising: a determining unit configured to determine whether or not the lighting device is ready for lighting; and a control unit configured to control the lighting device and the connected image pickup device, wherein the control unit prevents the lighting device from transmitting information to the communication unit when the lighting device is ready for lighting.

According to the present invention, it is possible to prevent a failure in light emission control caused due to communication with a lighting device such as the master and the slave.

Further features and advantages of the present invention will become apparent from the following detailed description of exemplary embodiments with reference to the attached drawings.

BRIEF DESCRIPTION OF THE DRAWINGS

FIG. 4 is a flowchart showing the procedure of a master control process implemented by a master flash in FIG. 1.

FIG. 5 is a flowchart showing the procedure of a slave control process implemented by a slave flash in FIG. 1.

DETAILED DESCRIPTION OF THE EMBODIMENTS

The present invention will now be described in detail with reference to the drawings.

Figure 1:
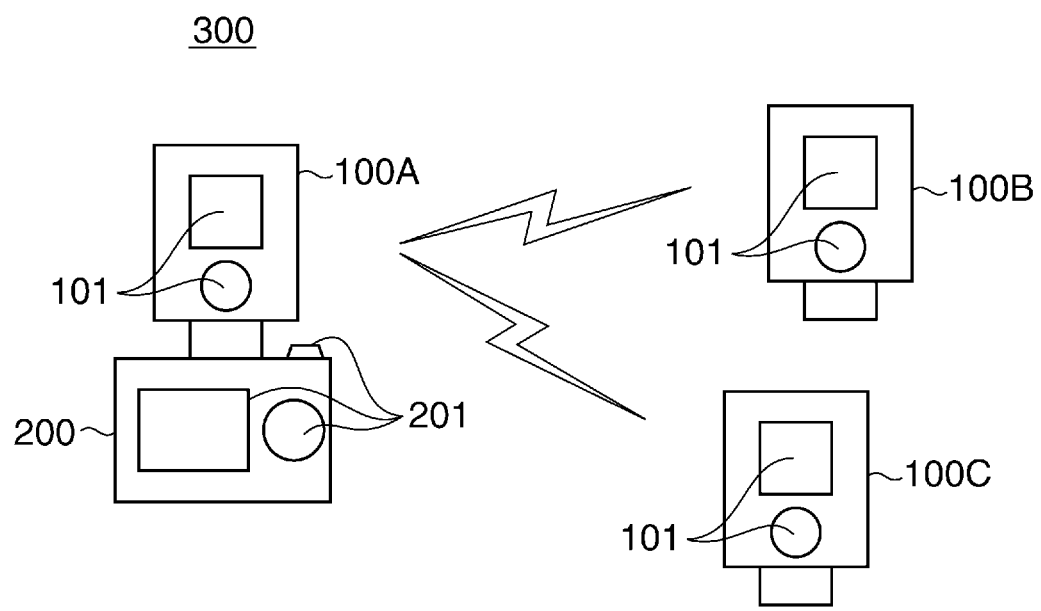
FIG. 1 is a view schematically showing a schematic configuration of a camera system according to an embodiment of the present invention.

FIG. 1 is a view schematically showing a schematic configuration of a camera system 300 according to an embodiment of the present invention.

In FIG. 1, a camera system 300 is constructed of flashes 100A, 100B, and 100C as a plurality (three in this view) of lighting devices, each of which emits light on a object, and a camera 200 as an image pickup device, and configures a multi-light control system.

The flash 100A (a communication device), among the three flashes 100A, 100B, and 100C, can be physically connected to the camera 200, and configures a master flash (a master lighting device).

Meanwhile, the flashes 100B and 100C other than the flash 100A operates as slave flashes. The flash 100A performs communication with each of the flashes 100B and 100C. The flash 100A also performs communication with the camera 200. Hereinafter, a common explanation to be given for the flashes 100A, 100B, and 100C will be referred to as "the flash(s) 100". Also, the flash 100A may be sometimes referred to as "the master", and the flashes 100B and 100C may be sometimes referred to as "the slaves". Moreover, the slave flashes may be configured as a single unit.

The flash 100 includes an operation display unit 101 for performing display and various settings regarding light emission. Also, the camera 200 includes an operation display unit 201 for performing release control, display and setting/switching of a camera shooting mode, and display of information about the slave flash.

Additionally, in FIG. 1, the number of the slave is two, but may be more than two.

Figure 2:
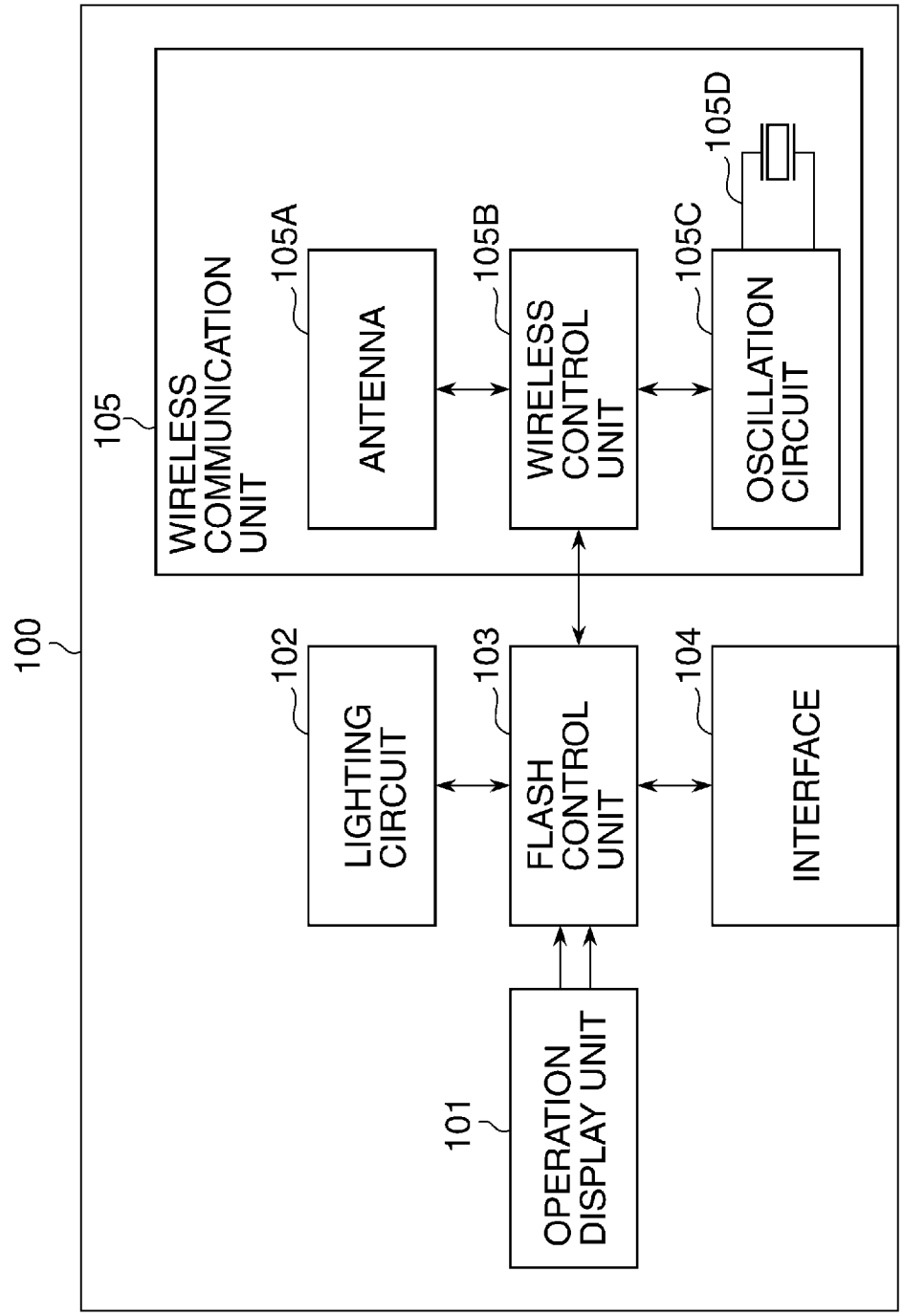
FIG. 2 is a view schematically showing a configuration of a flash in FIG. 1.

FIG. 2 is a view schematically showing a configuration of the flash 100 in FIG. 1.

In FIG. 2, the flash 100 includes an operation display unit 101, a lighting circuit 102, a flash control unit 103, an interface 104, and a wireless communication unit 105.

The flash control unit 103 is constructed of a CPU, a ROM, a RAM, and the like, and controls the entire flash 100. The flash 100 is controlled by the operation display unit 101 issuing an operation instruction to the flash control unit 103.

The lighting circuit 102 performs control related to light emission such as charging and light emission control, specifically performs light emission control by receiving a signal from the flash control unit 103 representing a light emission command and also transmits a signal representing charge completion to the flash control unit 103. The interface 104 operates as an interface for physically connecting to the camera 200 (FIG. 1). Communication with the camera 200 is performed via the interface 104.

The wireless communication unit 105, as a communication unit capable of performing bidirectional communication, performs wireless communication, and includes an antenna 105A, a wireless control unit 105B, an oscillation circuit 105C, and a crystal oscillator 105D.

The wireless communication unit 105 includes two modes, one of which is a type of the wireless communication unit 105 being embedded in the flash 100, and the other of which is a removable type of the wireless communication unit 105 being formed into a card with a card slot formed in the flash 100. The embedded type will be described in the present embodiment.

The antenna 105A transmits/receives data using wireless communication, and transmits data received from a communication counterpart to the wireless control unit 105B, and also receives data from the wireless control unit 105B and transmits the data to the communication counterpart.

The oscillation circuit 105C shapes the waveform of a clock signal generated by the crystal oscillator 105D connected to the oscillation circuit 105C, and outputs the shaped clock signal to each circuit of the wireless communication unit 105, which enables the each circuit to be synchronized.

Figure 3:
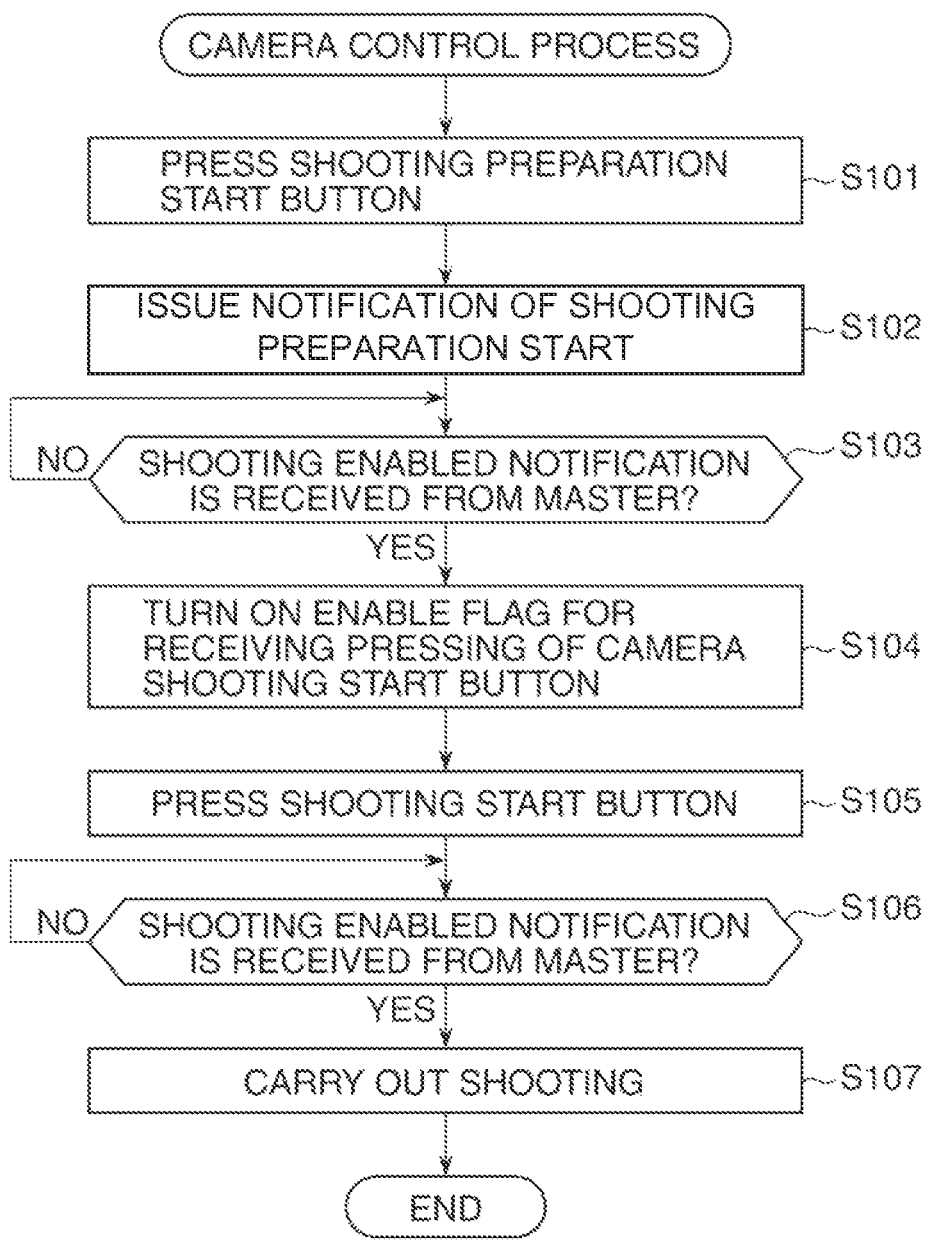
FIG. 3 is a flowchart showing the procedure of a camera control process implemented by a camera in FIG. 1.

FIG. 3 is a flowchart showing the procedure of a camera control process implemented by the camera 200 in FIG. 1.

This process is implemented by a CPU mounted in the camera 200.

In FIG. 3, when a shooting preparation start button on the operation display unit 201 is pressed by a user (step S101), the camera 200 transitions to a shooting preparation start state. That is, an instruction for carrying out shooting is input by the user.

Next, a shooting preparation start notification is issued to the master (step S102), which allows the camera 200 to transition to a waiting state for reception of a shooting enabled notification. The camera 200 never shoots when it is in the waiting state for reception of the shooting enabled notification.

When the shooting enabled notification is received from the master (YES to step S103), an enable flag for receiving pressing of a camera shooting start button is turned on (step S104), which allows the camera 200 to transition to a receiving state for pressing of the camera shooting start button. The camera 200 never shoots so long as it is not ready for receiving the camera shooting start button even if the camera shooting start button is pressed, Next, when the shooting start button on the operation display unit 201 is pressed by the user (step S105) and the shooting enabled notification is received from the master (YES to step S106), the shooting is carried out (step S107), followed by the process being terminated. As described, the shooting is carried out when the shooting enabled notification is received; accordingly, it is possible to prevent a failure in light emission control of the flash caused due to interference of communication.

FIG. 4 is a flowchart showing the procedure of a master control process implemented by the master flash 100A in FIG. 1.

This process is implemented by the CPU mounted on the flash control unit 103.

In FIG. 4, when the shooting preparation start notification of indicating that the shooting preparation is started is received from the camera 200 (step S201), it is determined whether or not the master is communicating with the slave (step S202).

As a result of the determination of the step S202, when the master is not communicating with the slave (NO to the step S202), it is determined whether or not the charging of the slave is completed (step S203). The slave regularly issues charge completion notifications to the master. When the master receives the notification, it holds information of indicating that the charging of the slave is completed, and hence the above-mentioned determination can be performed using this information. Moreover, determining whether or not the charging of the slave is completed corresponds to determining whether or not the slave is ready for lighting.

As a result of the determination of the step S203, when the charging of the slave is not completed (NO to the step S203), a slave charge completion information is requested to the slave (step S204), followed by repeating the process of the step S202 and the following steps.

On the other hand, as a result of the determination of the step S203, when the charging of the slave is completed (YES to the step S203), a communication disabled notification of instructing the slave not to transmit the information is issued, and also a shooting enabled notification of indicating that the shooting can be carried out is issued to the camera 200 (step S205), followed by the process being terminated.

According to the process of FIG. 4, when the notification regarding the start of shooting preparation is issued by the camera 200, in a case where the master and the slave are not communicating with each other (NO to the step S202) when the charging of the slave is completed (YES to the step S203), the slave is instructed not to transmit the information, and also the shooting enabled notification of indicating that the shooting can be carried out is issued to the camera 200 (step S205). That is, the camera 200 is prohibited to shoot until the slave is determined to become ready for lighting, and when it is determined that the slave becomes ready for lighting, the shooting enabled notification is issued to the camera 200 which is being prohibited to shoot. As a result, it is possible to prevent a failure in the light emission control due to communication between the lighting devices FIG. 5 is a flowchart showing the procedure of a slave control process implemented by the slave flashes 100B and 100C in FIG. 1.

This process is implemented by the CPU mounted on the flash control unit 103.

In FIG. 5, when the communication disabled notification is received from the master (step S301), a charge completion communication enable flag, indicating whether or not transmission of the information regarding the charge completion to the master is enabled, is turned off (step S302), followed by the process being terminated.

According to the process of FIG. 5, transmission of the information from the slave is not performed after the shooting is enabled, which prevents interference of the communication between the master and the slave.

Figure 6:
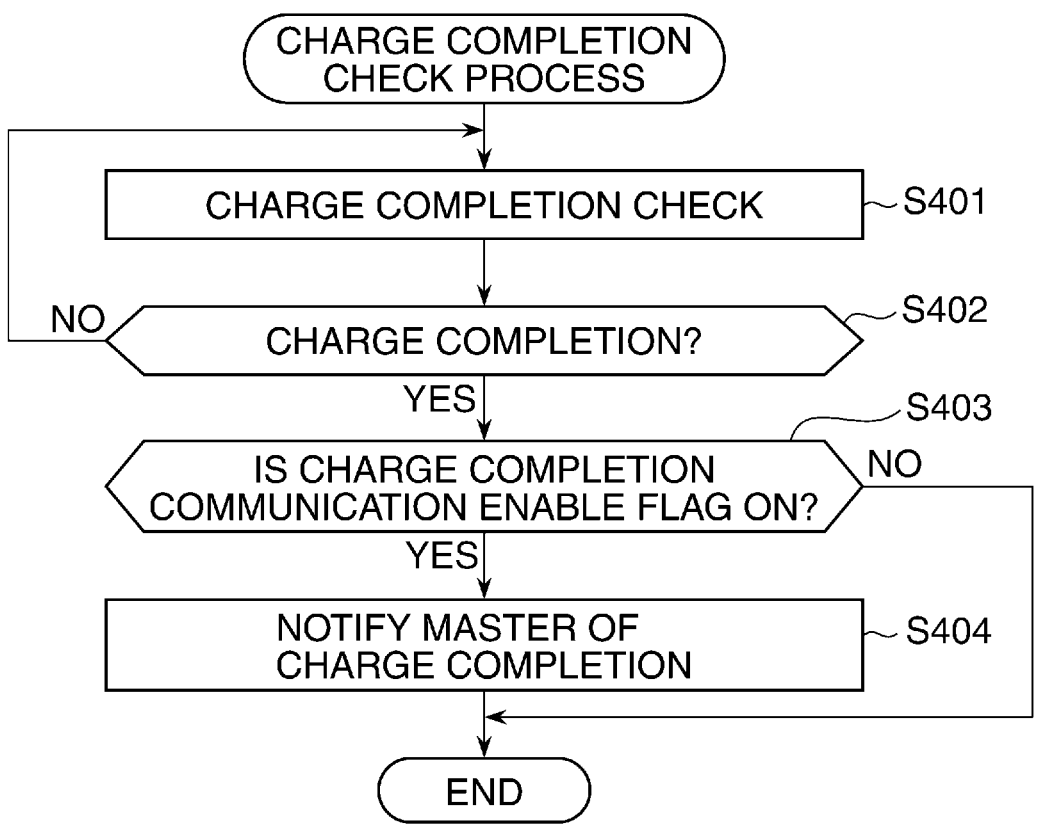
FIG. 6 is a flowchart showing the procedure of a charge completion check process implemented by the slave flash in FIG. 1.

FIG. 6 is a flowchart showing the procedure of a charge completion check process implemented by the slave flashes 100B and 100C in FIG. 1.

This process is implemented by the CPU mounted on the flash control unit 103. Also, this charge completion check process is regularly implemented by the slave.

In FIG. 6, when a charge completion check is performed (step S401) and the charge state is changed to the charge completion (step S402), it is determined whether or not the charge completion communication enable flag is turned on (step S403).

As a result of the determination of the step S403, when the charge completion communication enable flag is on (YES to the step S403), the charge completion is notified to the master (step S404), followed by the process being terminated, whereas when the charge completion communication enable flag is off (NO to the step S403), the process is immediately terminated. Thus, when the communication disabled notification is received, the notification of step S404 is prohibited (skipped).

According to the process fFIG. 6, when the charge completion notification enable flag is off, the transmission of the information from the slave to the master is not performed, which prevents interference of the communication between the master and the slave.

According to the embodiment described above, it is possible to realize the bidirectional communication between the master and the slave except when the shooting is enabled, whereas transmission of the information from the slave is not performed when the shooting is enabled, thereby preventing interference of the communication between the master and the slave, which prevents a failure in the light emission control for the flash.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, in the embodiment described above, the master flash issues a notification of the shooting by the camera is enabled or a notification of the communication from the slave flash is prohibited, but the present invention may also be applied to a communication device that is connected to the camera and that does not include a lighting circuit. Such a configuration can prevent a failure in the lighting control caused due to communication between the communication device and the lighting device.

This application claims the benefit of Japanese Applications No. 2011-255053, filed Nov. 22, 2011, which is hereby incorporated by reference herein in its entirety.

What is claimed is:

1. A communication device, capable of connecting to an image pickup device, wherein the communications device transmits a lighting instruction from the image pickup device to an external lighting device through a communication unit capable of performing bidirectional communication, comprising:
   a determining unit configured to determine whether or not the external lighting device is ready for lighting; and
   a control unit configured to control the external lighting device and the connected image pickup device,
   wherein the control unit prevents the external lighting device from transmitting information to the communication unit when the external lighting device is ready for lighting, and
   wherein the determining unit is implemented at least in part by a processor executing at least one program recorded on a non-transitory memory device.

2. The communication device as claimed in claim 1, wherein the control unit inhibits the connected image pickup device from shooting until the external lighting device becomes ready for lighting, when the external lighting device is not ready for lighting.

3. The communication device as claimed in claim 1, wherein the control unit inhibits the connected image pickup device from shooting until the external lighting device becomes ready for lighting, when the image pickup device is in a mode of performing the lighting instruction to the external lighting device in connection to shooting.

4. The communication device as claimed in claim 3, wherein the control unit inhibits the connected image pickup device from shooting until the external lighting device becomes ready for lighting, even if the connected image pickup device receives an instruction of a user causing the connected image pickup device to shoot.

5. The communication device as claimed in claim 1, wherein the control unit instructs the connected image pickup device to be ready for inhibiting shooting until the external lighting device becomes ready for lighting, when the external lighting device is not ready for lighting.

6. The communication device as claimed in claim 1, wherein the control unit instructs the connected image pickup device to be ready for shooting, when the external lighting device is ready for lighting.

7. The communication device as claimed in claim 1, wherein the determining unit determines whether or not the external lighting device is ready for lighting, based on information representing a charging state transmitted from the external lighting device to the communication unit.

8. The communication device as claimed in claim 7, wherein the determining unit determines that the external lighting device is ready for lighting when the information representing the charging state indicates that the charge is completed, and determines that the external lighting device is not ready for lighting when the information representing the charging state indicates that the charge is not completed.

9. The communication device as claimed in claim 7, wherein the determining unit repeatedly determines whether or not the lighting device is ready for lighting, until the external lighting device becomes ready for lighting.

10. A control method of a communication device, capable of connecting to an image pickup device, wherein the communications device transmits a lighting instruction from the image pickup device to an external lighting device through a communication unit capable of bidirectional communication, the control method comprising:
    determining whether or not the external lighting device is ready for lighting; and
    controlling the external lighting device and the connected image pickup device,
    wherein controlling the external lighting device comprises preventing the external lighting device from transmitting information to the communication unit when the external lighting device is ready for lighting.

11. An apparatus, comprising:
    an interface configured to connect to an image pickup device;
    a lighting circuit;
    a wireless communication unit configured to communicate with a lighting device; and
    a control unit connected to the interface, the lighting circuit, and the wireless communication unit, the control unit being configured to disable communication with the lighting device when the lighting device is ready for lighting.

12. The apparatus of claim 11, wherein the control unit disables communication with the lighting device by preventing the lighting device from transmitting information to the wireless communication unit.

13. The apparatus of claim 12, wherein the control unit prevents the lighting device from transmitting information to the wireless communication unit by issuing a communication disable notification to the lighting device.

* * * * *